United States Patent [19]

Bambara

[11] 4,345,274
[45] Aug. 17, 1982

[54] OBJECT IDENTIFICATION SYSTEM UTILIZING CLOSED CIRCUIT TELEVISION

[75] Inventor: Joseph E. Bambara, North Babylon, N.Y.

[73] Assignee: Servo Corporation of America, Hicksville, N.Y.

[21] Appl. No.: 195,102

[22] Filed: Oct. 8, 1980

[51] Int. Cl.³ .............................................. H04N 7/18
[52] U.S. Cl. .................................. 358/108; 358/225; 358/125
[58] Field of Search ................. 358/108, 225, 93, 125

[56] References Cited

U.S. PATENT DOCUMENTS 2,836,816  5/1958  Allison ................................ 358/225
3,320,363  5/1967  Laird .................................. 358/225
4,040,087  8/1977  Hall ................................... 358/113
4,264,927  4/1981  Raymond ............................ 358/108

Primary Examiner—Howard Britton
Attorney, Agent, or Firm—Kane, Dalsimer, Kane, Sullivan and Kurucz

[57] ABSTRACT

A system to permit the visual observation of objects moving along a fixed path. The object is viewed through a television camera which images the object through an optic axis bending element. The bending element is angularly rotated in a sawtooth manner with the slope of the sawtooth determined by the speed at which the object moves along the path so as to track the object to immobilize the scene viewed by the mirror.

10 Claims, 3 Drawing Figures

OBJECT IDENTIFICATION SYSTEM UTILIZING CLOSED CIRCUIT TELEVISION

BACKGROUND OF THE INVENTION

The present invention relates to moving object identification systems and in particular to a closed circuit television system for object identification utilizing motion compensation.

In order to keep track of the vast number of freight cars which travel along the nations railways system, each car is assigned a number which appears prominently on the cars. Over the years various systems have been proposed to facilitiate the reading of the numbers by railway personnel. In one such system, it has been proposed to utilize closed circuit television to view the cars passing a sensing station. The television camera is connected to a monitor in a control tower (directly or through a tape recorder) and an inspector in the tower reads the identification number of the cars passing the inspection station.

While the above system would work effectively if the cars stopped or moved through the inspection facility at slow speeds (i.e., less than 15 mph). A major problem is encountered when a large number of trains pass through the inspection stations at speeds in excess of 15 miles per hour. At 15 miles per hour, a car moves approximately 4.4 inches in the 1/60 second exposure time of a TV field. This motion is sufficient to produce a significant blur to make reading of the identification number of the freight car difficult for an inspector watching a TV monitor. At speeds even slightly in excess of 15 mph the motion blur becomes highly pronounced and sufficiently intolerable so that it becomes impossible to read the numbers from the monitor.

To compensate for the motion blurring problem discussed above, it has heretofore been proposed to provide a shutter in the optical path of the TV camera to effectively serve to reduce the exposure time to a fraction of a TV field and in effect stop the motion of the train as imaged by the TV camera. The shutter exposure time may be fixed or synchronized to the train speed. In either case, the use of the shutter serves to reduce the light entering the camera optical path and in many instances the reduction of light must be compensated for by the use of artificial lighting. This provides for an expensive and complex system.

In view of the above, it is the principal object of the present invention to provide a closed circuit television object identification system having improved motion compensation.

A further object of the present invention is to provide such a system in which motion compensation is attained with virtually no sacrifice of the sharpness or quality of the resultant image.

A still further object is to provide a system which utilizes conventional components and which may readily be implemented and retrofitted into existing railroad facilities.

SUMMARY OF THE INVENTION

The above and other beneficial objects and advantages are attained in accordance with the present invention by providing an improved system for permitting visual observation of objects moving along a fixed path through the use of closed circuit television. A television camera is positioned to view the side of a moving object through an optical element such as a mirror or prism, rotatably mounted along an axis extending perpendicular to the path of motion of the object. Means are provided for determining the speed of an object as it approaches the portion of the path and to transmit a signal representative of the determined speed. The signal is used to rotate the optic element thereby bending the optic axis to follow a portion of the object as it moves along the track. The optic element is rotated in a sawtooth fashion (i.e., with a quick return to a neutral starting position after each successive scan) at an angular velocity equal to one half the angular velocity of the moving object relative to the TV camera. This velocity is equal to the linear velocity of the object divided by the perpendicular distance of the camera to the path of motion of the object. To insure against image loss, the element is rapidly returned to its neutral position cyclically so that there is at least some overlap of the image between successive cycles.

DETAILED DESCRIPTION OF THE PREFERRED EMBODIMENT

Figure 1:
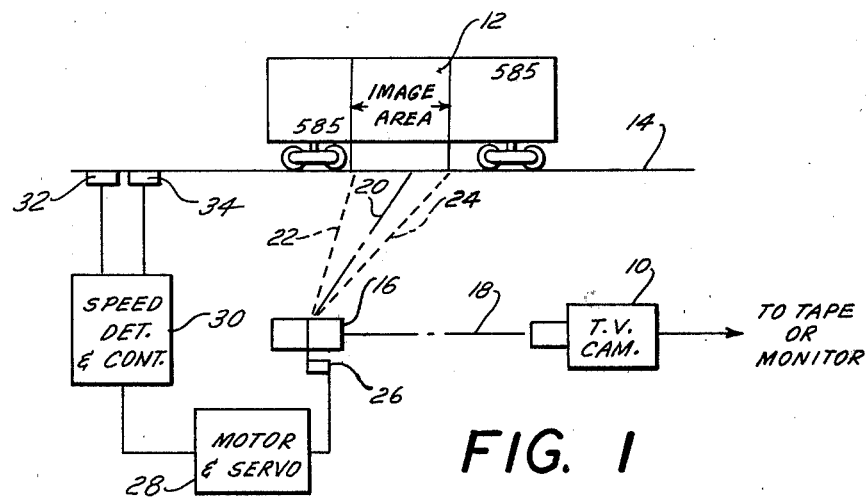
FIG. 1 is a schematic block diagram of the object identification system of the present invention.
Figure 2:
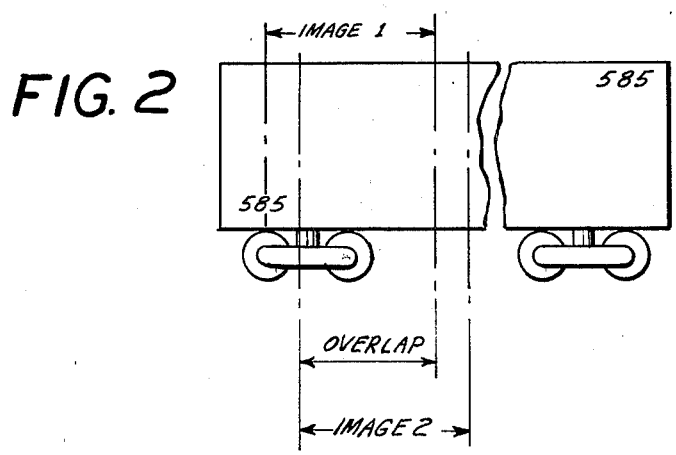
FIG. 2 is a schematic representation of two consecutive mirror cycles depicting the extent of image overlap.

Reference is now made to the drawings and to FIG. 1 in particular wherein a system in accordance with the present invention is depicted in schematic form. In accordance with the present invention, a television camera 10 is set up at a rail site to view passing freight cars 12 that move along a track 14. The camera views the cars through a mirror 16 so that the optic axis comprises a first segment 18 between the camera optics and mirror 16 and a second segment 20 between the mirror and car 12. In order to cover a 16 foot (left-to-right) section of the car 12, which is defined by the boundaries 22 and 24, with a typical, commercially available CCTV camera having a lens focal length on the order of one inch, the total distance of the camera from the car should be approximately 30 feet. That is, the combined length of optic axis segments 18 and 20 should be equal approximately 30 feet. In a preferred practice of the invention, the distance of the mirror from the track site (i.e., segment 20) was substantially 30 feet with the distance from the camera to the mirror (i.e., segment 18) comprising merely 2 or 3 inches.

Mirror 16 is a low intertia mirror and is mounted for rotation about an axis 26. The mirror is rotated through action of a galvonometer and servo 28 to track a car 12 as it moves along the track segment. That is, the mirror is rotated so that the field of view of the camera follows and keeps fixed the car over a short distance. To this end, the galvonometer and servo are controlled by a speed controller 30 which receives information from a pair of track site wheel presence transducers 32 and 34 relating to the speed of the car. These transducers 32 and 34 are set a fixed distance apart from each other. The controller 30 converts inputs from the transducers as to when each transducer is tripped by a particular wheel of the car and converts this input information into a signal indicative of the train speed.

Figure 3:
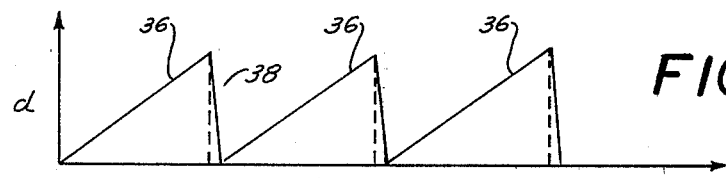
FIG. 3 is a waveform diagram of the sawtooth sweep of the mirror.

The motor and servo 28 drive the mirror in a sawtooth fashion as shown in FIG. 3. The slope 36 of each sawtooth is determined by the speed of the train, the faster the train, the greater the angular velocity at which mirror 16 must be rotated and hence the steeper the slope of each sawtooth. The retrace should be as fast as possible and hence close to vertical as possible. Toward this end, the mirror is designed for low inertia and the motor is of the galvonometer type, as stated.

Thus, as a car passes the observation section, the mirror 16, in effect, tracks the car through a series of sweeps thereby enabling the camera to obtain a clear image from the mirror free of motion blur. During each successive sweep it is desirable that there be at least some overlap to insure that the inspector views the entire car. Preferably the overlap should be substantial, on the order of 60%. Bearing in mind that a train can be anticipated to travel through the inspection zone at anywhere between 5 and 80 miles per hours, the following table sets forth the required mirror sweeps per second for various train speeds where the camera is located 30 feet from the track side and hence the path of the train under observation.

| OBJECT SPEED | | | Angular velocity of optic axis | mirror sweep/sec for 60% overlap |
|---|---|---|---|---|
| mph | ft/sec | inches/sec | radians/sec | and 30 ft distance |
| 5 | 7.33 | 88 | .244 | 1.14 |
| 10 | 14.7 | 176 | .489 | 2.29 |
| 15 | 22.0 | 264 | .733 | 3.44 |
| 20 | 29.3 | 352 | .978 | 4.58 |
| 30 | 44.0 | 528 | 1.47 | 6.88 |
| 40 | 58.7 | 704 | 1.96 | 9.17 |
| 50 | 73.3 | 880 | 2.44 | 11.5 |
| 60 | 88 | 1056 | 2.93 | 13.8 |
| 80 | 117.3 | 1408 | 3.91 | 18.3 |

The mirror sweep per second range of 1.14 to 18.3 may be attained with commercially available low inertia galvo driven mirrors in a closed loop servo system. At low and mid-range train speeds the mirror retrace can be relatively short to avoid dead time between sweeps. As the highest train speed is approached, however, the mirror retrace time can become a significant portion of the desired sweep period since 1/18.3 seconds equal 54.5 MS and a complete TV frame occupies approximately 33 MS thus leaving only 21.5 MS for the retrace. As noted, however, even this relatively short retrace time is realizable with a low inertia mirror and low inertia closed loop galvo servo.

Thus, in accordance with the above, the aforementioned objectives are attained.

Having thus described the invention, what is claimed is:

1. An object identification system for permitting visual observation, through a television camera, of an object travelling along a portion of a fixed path, said system comprising:
   a television camera;
   an effective optic axis of said television camera directed at said object path of travel through an optic axis bending element;
   an optic axis bending element positioned along said optic axis;
   means for determining the speed of said object;
   and means responsive to said speed determining means for rotating said optic element at an angular velocity related to the speed of said object so as to bend said optic axis to follow said object as said object moves along said path portion.

2. The system in accordance with claim 1 wherein said optic axis bending element comprises a low intertia sweeping mirror.

3. The system in accordance with claim 2 wherein said mirror is positioned on the object side of the camera lens.

4. The system in accordance with claim 2 wherein said mirror is mounted for rotation about an axis generally perpendicular to the said optical axis and the moving path and said moving means includes means for oscillating said mirror about said rotational axis.

5. The system in accordance with claim 4 wherein said mirror is repetitively oscillated in a sawtooth manner from a starting position through a predetermined angle and then returned to said starting position with said mirror sweep speed determined by the speed of said object.

6. The system in accordance with claim 5 wherein during each cycle of said mirror there is some overlap of the imaged object as compared with that of the previous cycle.

7. The system in accordance with claim 6 wherein during each cycle of said mirror there is substantially 60% overlap of the imaged object as compared with the previous cycle.

8. A method for reading indicia on objects moving along a portion of a fixed path comprising the steps of:
   (a) imaging a television camera on said portion of the fixed path through a television camera optical axis bending element;
   (b) determining the speed at which said object moves along said fixed path; and
   (c) displacing said optical element about an axis perpendicular to said optical axis to follow the moving object across the path portion at an angular velocity related to said determined speed.

9. The method in accordance with claim 8 wherein said bending element is displaced in a sawtooth manner.

10. The method in accordance with claims 8 or 9 wherein during each displacement of said optical axis bending element there is overlap of the imaged object as compared with the previous cycle.

* * * * *